US012101370B2

(12) United States Patent
Zhong et al.

(10) Patent No.: US 12,101,370 B2
(45) Date of Patent: Sep. 24, 2024

(54) SYSTEM AND METHOD FOR DETERMINING NETWORK TRANSMISSION PERFORMANCE IN REAL-TIME COMMUNICATION OVER INTERNET

(71) Applicant: Agora Lab, Inc., Santa Clara, CA (US)

(72) Inventors: Sheng Zhong, Santa Clara, CA (US); Jiajie Jian, Shanghai (CN); Tao Duan, Shanghai (CN)

(73) Assignee: Agora Lab, Inc., Santa Clara, CA (US)

( * ) Notice: Subject to any disclaimer, the term of this patent is extended or adjusted under 35 U.S.C. 154(b) by 0 days.

(21) Appl. No.: 18/195,965

(22) Filed: May 11, 2023

(65) Prior Publication Data
US 2023/0421626 A1    Dec. 28, 2023

Related U.S. Application Data

(60) Provisional application No. 63/354,455, filed on Jun. 22, 2022.

(51) Int. Cl.
*H04L 65/80*  (2022.01)
*H04L 1/16*  (2023.01)
*H04L 43/0829*  (2022.01)

(52) U.S. Cl.
CPC .......... *H04L 65/80* (2013.01); *H04L 1/16* (2013.01); *H04L 43/0829* (2013.01)

(58) Field of Classification Search
CPC ....... H04L 65/80; H04L 1/16; H04L 43/0829; H04L 43/50; H04L 41/5067; H04L 41/145
See application file for complete search history.

(56) References Cited

U.S. PATENT DOCUMENTS

| | | | | |
|---|---|---|---|---|
| 2002/0154641 | A1* | 10/2002 | McGowan | H04L 41/5025 370/471 |
| 2006/0029065 | A1* | 2/2006 | Fellman | H04L 47/10 370/389 |
| 2006/0190594 | A1* | 8/2006 | Jorgenson | H04L 43/50 709/224 |
| 2007/0053303 | A1* | 3/2007 | Kryuchkov | H04L 43/0852 370/252 |

(Continued)

OTHER PUBLICATIONS

Silveira, Fernando, and Edmundo de Souza e Silva. "Predicting packet loss statistics with hidden Markov models for FEC control." Computer Networks 56.2 (2012): 628-641.*

(Continued)

*Primary Examiner* — Jimmy H Tran
(74) *Attorney, Agent, or Firm* — The Law Offices of Konrad Sherinian, LLC; Depeng Bi

(57) ABSTRACT

A system and method for determining the performance of a real-time communication application, such as a video codec and transmission of the coded data. The method factors in burst data packet loss in determining a performance measure. The method uses a Hidden Markov Model on a set of data packets of a unit of data to determine the performance measure in the form a probability that all the data packets within the set are received. The measure is used to fine tune the system settings. The method causes the real-time communication application to adjust parameters of the application for improved transmission of data packets. The adjustment of a parameter can be an increase or a decrease.

19 Claims, 10 Drawing Sheets

(56) References Cited

U.S. PATENT DOCUMENTS

| | | | | |
|---|---|---|---|---|
| 2008/0192738 | A1* | 8/2008 | Florencio | H04L 1/0045 370/389 |
| 2008/0232521 | A1* | 9/2008 | Rodbro | H04L 47/283 375/354 |
| 2010/0220615 | A1* | 9/2010 | Enstrom | H04L 47/283 370/252 |
| 2011/0013511 | A1* | 1/2011 | Li | H04W 28/0242 370/231 |
| 2011/0261146 | A1* | 10/2011 | Kamath | H04N 7/148 348/14.08 |
| 2012/0287986 | A1* | 11/2012 | Paniconi | H04N 19/174 375/E7.126 |
| 2012/0290900 | A1* | 11/2012 | Paniconi | H03M 13/356 714/776 |
| 2013/0230043 | A1* | 9/2013 | Anandakumar | H04L 47/34 370/352 |
| 2015/0100858 | A1* | 4/2015 | Zhovnirnovsky | H04L 69/16 714/776 |
| 2015/0172455 | A1* | 6/2015 | Lu | H04M 3/2236 370/252 |
| 2015/0207710 | A1* | 7/2015 | Dickins | H04L 65/80 370/252 |
| 2015/0244761 | A1* | 8/2015 | Tsyganok | H04L 1/08 709/219 |
| 2016/0028418 | A1* | 1/2016 | Subasingha | H03M 13/353 714/774 |
| 2016/0323062 | A1* | 11/2016 | Yang | H04W 28/12 |
| 2017/0272375 | A1* | 9/2017 | Muesch | H04L 47/283 |
| 2019/0104079 | A1* | 4/2019 | Wang | H04L 43/16 |
| 2019/0191130 | A1* | 6/2019 | Wang | H04N 21/64738 |
| 2019/0356557 | A1* | 11/2019 | Burgio | H04L 47/34 |
| 2019/0394105 | A1* | 12/2019 | Ho | H04L 43/0835 |
| 2020/0322082 | A1* | 10/2020 | Wang | H04W 28/0268 |
| 2020/0344287 | A1* | 10/2020 | Huang | H04L 65/80 |
| 2021/0376965 | A1* | 12/2021 | Liu | H04N 21/6473 |
| 2022/0109622 | A1* | 4/2022 | Yeh | H04L 69/40 |
| 2023/0262209 | A1* | 8/2023 | Dai | H04N 19/164 348/180 |

OTHER PUBLICATIONS

Rodbro, Christoffer A., et al. "Hidden Markov model-based packet loss concealment for voice over IP." IEEE Transactions on Audio, Speech, and Language Processing 14.5 (2006): 1609-1623.*

Li, Zhicheng, et al. "Modeling and analysis of distortion caused by Markov-model burst packet losses in video transmission." IEEE Transactions on circuits and systems for video technology 19.7 (2009): 917-931.*

Rossi, P. Salvo, et al. "Joint end-to-end loss-delay hidden Markov model for periodic UDP traffic over the Internet." IEEE Transactions on Signal Processing 54.2 (2006): 530-541.*

Ellis, Martin, et al. "A two-level Markov model for packet loss in UDP/IP-based real-time video applications targeting residential users." Computer Networks 70 (2014): 384-399.*

Ilyas, Muhammad U., and Hayder Radha. "Modeling, estimating and predicting the packet-level Bit Error Rate process in IEEE 802.15. 4 LR-WPANs using Hidden Markov Models." 2009 43rd Annual Conference on Information Sciences and Systems. IEEE, 2009.*

* cited by examiner

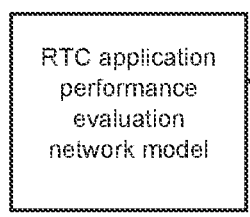
Fig. 10
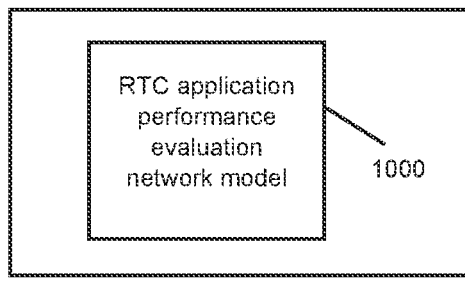
Fig. 11
Fig. 12
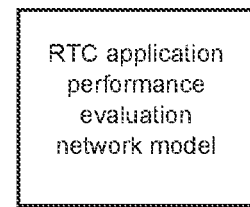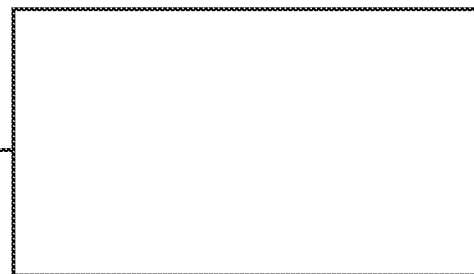

SYSTEM AND METHOD FOR DETERMINING NETWORK TRANSMISSION PERFORMANCE IN REAL-TIME COMMUNICATION OVER INTERNET

CROSS REFERENCE TO RELATED APPLICATIONS

This application claims the priority benefit of U.S. Provisional Pat. App. No. 63/354,455, filed Jun. 22, 2022, entitled "SYSTEM AND METHOD FOR DETERMINING NETWORK TRANSMISSION PERFORMANCE IN REAL-TIME COMMUNICATION OVER INTERNET," assigned to Agora Lab, Inc. of Santa Clara, California, which is hereby incorporated by reference herein in its entirety. This application is related to U.S. patent application Ser. No. 18/093,788, entitled "SYSTEM AND METHOD FOR DETERMINING VIDEO CODEC PERFORMANCE IN REAL-TIME COMMUNICATION OVER INTERNET," filed Jan. 5, 2023, assigned to Agora Lab, Inc. of Santa Clara, California, which is hereby incorporated by reference.

FIELD OF THE DISCLOSURE

The present invention generally relates to real-time communication (RTC) over a network, and more particularly relates to a system and method for evaluating the quality of experience of RTC use cases over the Internet. More particularly still, the present disclosure relates to a system and method for determining the performance of RTC communication technologies and software applications with burst loss taken into consideration.

DESCRIPTION OF BACKGROUND

Real-time communication (RTC) over the Internet has become more accepted in improving productivity and life quality. In communication over the Internet, data is transmitted in the form of data packets (or packets for short). However, the communication network can be in conditions that cause data packets lost during transmission. The packet loss impacts the data delivery success rate. The reasons causing packet loss can be many. For example, one reason is that the WiFi signal is interfered and noisy when a WiFi connection is used to access the Internet. As another example, the network traffic is congested somewhere along the network transmission path. Simulating the network condition is necessary for experimenting and evaluating the performance of many network transmission technologies and products.

Network packet loss models that assume a random loss rate for any single packet in the use case of video Real Time Communication have been proposed. Such a model does not consider the case that a trunk of packets could be lost during transmission (also referred to as burst loss). Oftentimes, Burst loss reflects the real world RTC's actual packet loss during transmission over a network (such as the Internet). In particular, such a model may not address the reason of network congestion. Accordingly, there is a need for a new method and framework for evaluating the performance of RTC use cases, applications and technologies. The new framework presents a new system and method for evaluating the performance of a RTC video codec with an improved network model that can be used to evaluate the performance of a video codec for real-time communication (RTC) applications. In particular, the improved new model takes burst loss into consideration when evaluates the performance of RTC use cases, applications and technological products.

SUMMARY OF THE DISCLOSURE

Generally speaking, pursuant to the various embodiments, the present disclosure provides a method for determining performance measures of a real-time communication application. The method is performed by a real-time communication application performance measure determination network model. It includes associating a random packet loss rate to data packets for transmission over a network; determining a subset of network conditions that can trigger a subset of burst loss classes of burst packet loss; and determining a subset of burst packet loss rates corresponding to the subset of burst loss classes of burst packet loss. The random packet loss rate and the subset of burst packet loss rates form a set of packet loss rates. The set of packet loss rates corresponds to a set of classes of data packets. Each data packet belongs to one class of data packets within the set of classes of data packets. The set of classes of data packets corresponds to a set of probability distribution. Each class of data packets within the set of classes of data packets corresponds to a probability distribution within the of probability distributions. A sum of all probability distributions within the set of probability distributions is one. A sum of all packet loss rates within the set of packet loss rates is one or smaller than one. The method further includes applying a Hidden Markov Model to a unit of data for transmission over the network, the unit of data including a set of data packets. For each data packet within the set of data packets, the data packet belongs to a first class of data packets within the set of class of data packets at a first time. The network model determines a first reception status of the data packet at the first time, the first reception status indicating whether the data packet is received or lost. When the first reception status indicates that the data packet is lost, the network model retransmits the data packet for a number of times until the data packet is received or the number of retransmission has reached a predetermined maximum retransmission number. In addition, the method includes determining a unit data transmission success probability that each data packet within the set of data packets of the unit of day is received based on the set of packet loss rates, the set of probability distribution, the first reception status, and reception statuses of the number of retransmission. More over, the method includes, based on unit data transmission success probability, causing an adjustment in a data packet transmission parameter of the RTC application. When the network model retransmits the data packet, at a second time, the network model determines a second reception status of the data packet at the second time, the second reception status indicating whether the data packet is received or lost, wherein the data packet belongs to a second class of data packets within the set of class of data packets at the second time. The network is the Internet. The subset of network conditions includes zero or more network conditions. The unit of data is a unit of video data. The adjustment is an increase in the predetermined maximum retransmission number or a decrease in the predetermined maximum retransmission number.

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 2 is a block diagram of a real-time communication device having an improved real-time communication application in accordance with this disclosure.

FIG. 10 is a block diagram illustrating an improved network model for determining a performance measure of a real-time communication application in accordance with this disclosure.

FIG. 11 is a block diagram illustrating an improved network model for determining a performance measure of a real-time communication application in accordance with this disclosure.

FIG. 12 is a block diagram illustrating an improved network model for determining a performance measure of a real-time communication application in accordance with this disclosure.

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skill in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

Figure 1:
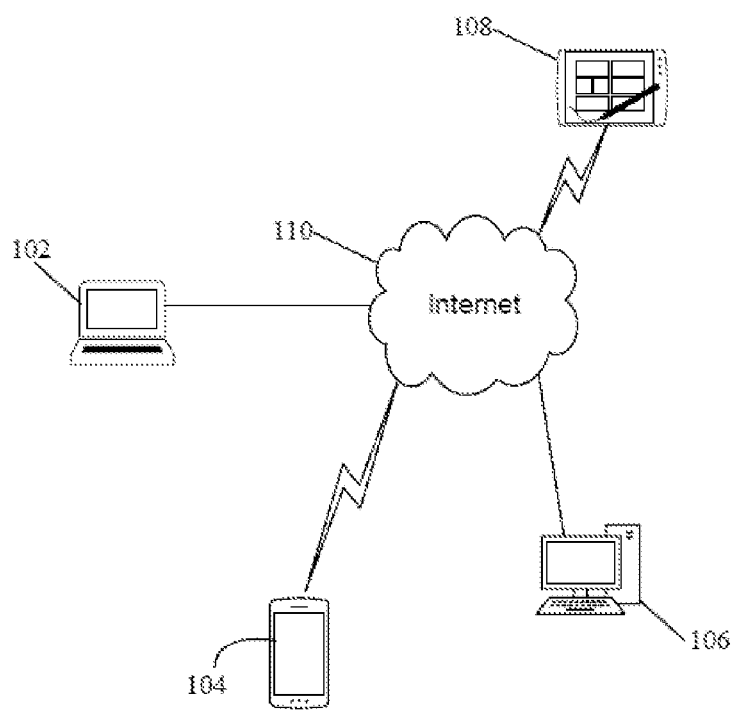
FIG. 1 is a block diagram of a real-time communication system in accordance with this disclosure.

Turning to the Figures and to FIG. 1 in particular, a block diagram illustrating a real-time communication (RTC) system is shown and generally indicated at 100. The real-time video communication system 100 includes a set of participating electronic devices, such as those indicated at 102, 104, 106 and 108. The real-time video communication system electronic devices 102-108 communicate with each other over the Internet 110. When one device, such as 102, sends video (or audio) data to the other devices, the device 102 is referred to as a sender and the sending end while the other devices are referred to as receivers and the receiving ends regarding the particular piece of data. They connect to the Internet 110 via local area networks, such as Wi-Fi networks, public cellular phone networks, Ethernet networks, etc. Each of the electronic devices 102-108 is further illustrated by reference to FIG. 2.

Referring to FIG. 2, a simplified block diagram of a real-time video communication device, such as the device 102, is shown. The device 102 includes a processing unit (such as a central processing unit (CPU)) 202, some amount of memory 204 operatively coupled to the processing unit 202, one or more input interfaces (such as a mouse interface, a keyboard interface, a touch screen interface, etc.) 206 operatively coupled to the processing unit 202, an audio output interface 210 operatively coupled to the processing unit 202, a network interface 216 operatively coupled to the processing unit 202, a video output interface 214 (such as a display screen) operatively coupled to the processing unit 202, a video input interface 212 (such as a camera) operatively coupled to the processing unit 202, and an audio input interface 208 (such as a microphone) operatively coupled to the processing unit 202. The device 102 also includes an operating system 220 and a specialized real-time video communication software application 222 adapted to be executed by the processing unit 202. The real-time video communication software application 222 is programmed using one or more computer programming languages, such as C, C++, C #, Java, etc. It includes components and modules for evaluating the performance of a RTC software application or a video codec scheme for RTC communications over the Internet.

Figure 3:
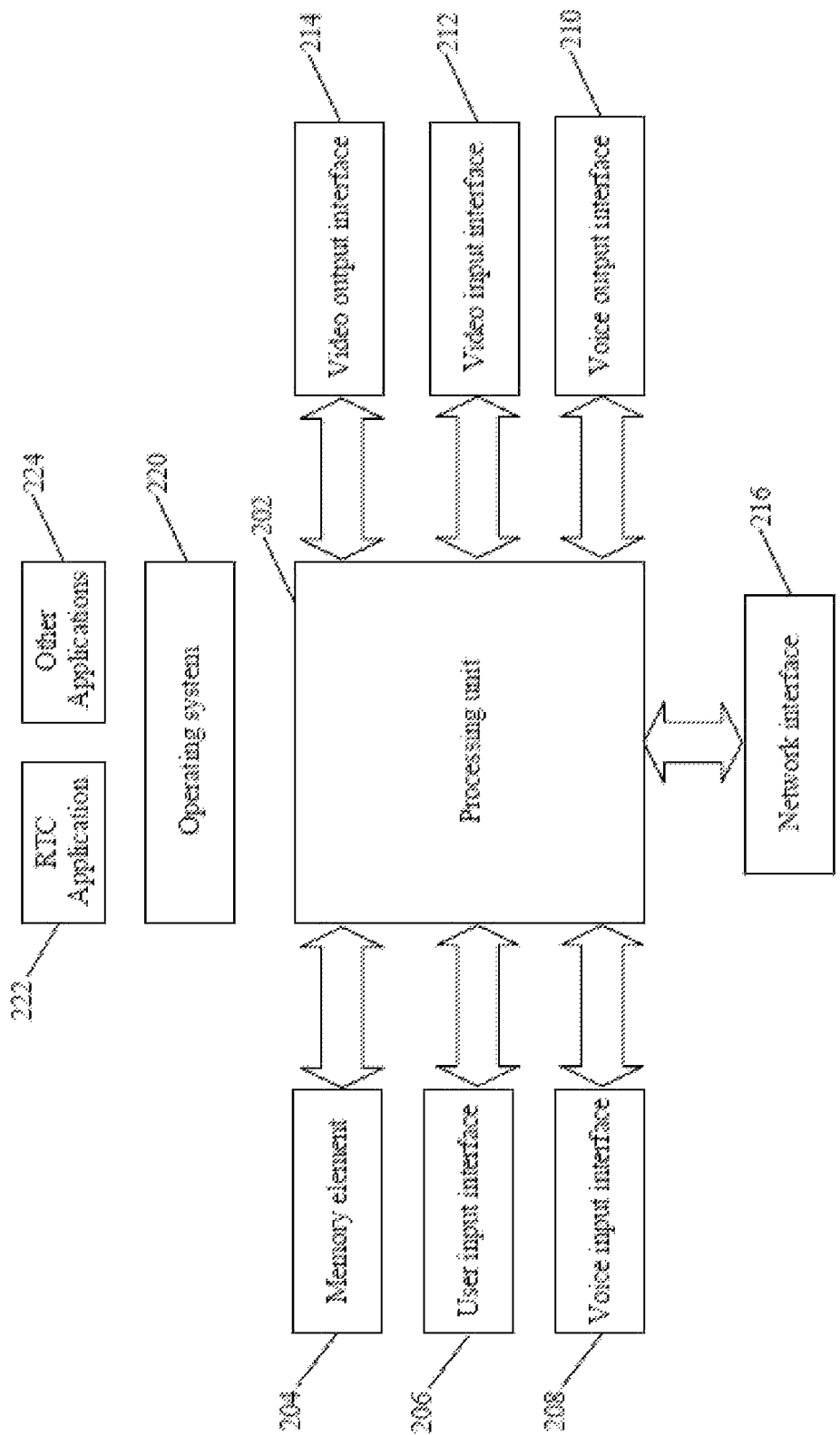
FIG. 3 is a block diagram illustrating a RTC system in accordance with this disclosure.
Figure 3:
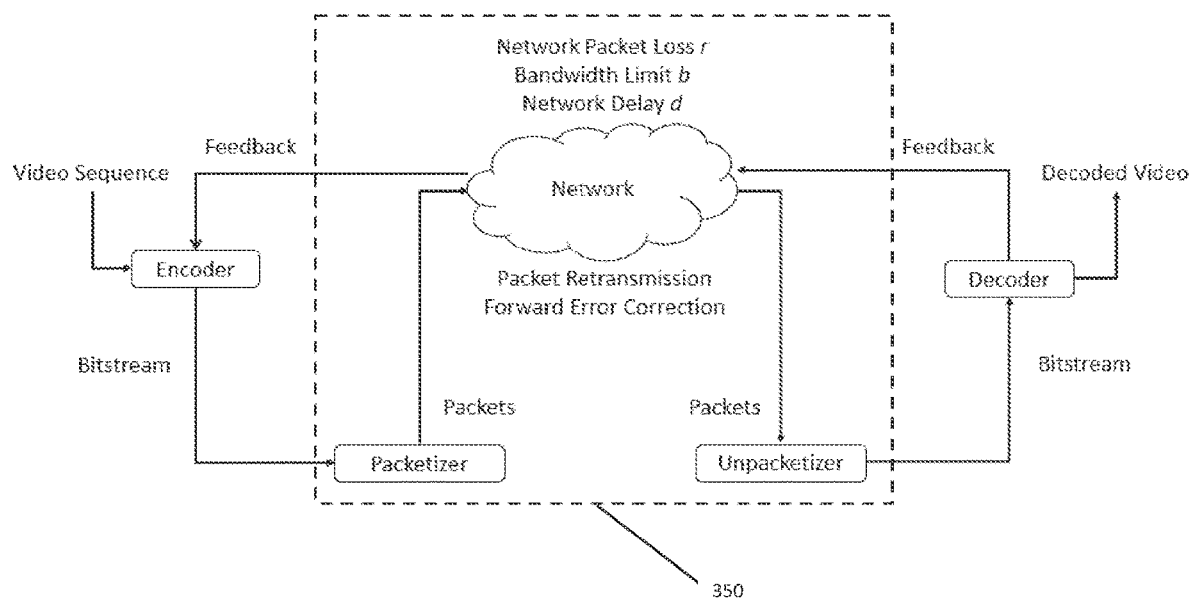

In an RTC use case, as shown in FIG. 3, the encoder encodes the video sequence and sends the coded bitstream to the Packetizer. The video sequence consists of several pictures or frames. A frame may be further partitioned into slices or tiles. A video unit for coding may mean a frame, a slice, or a tile.

The Packetizer packs the encoded video stream into several data packets and sends these packets to the decoder at the receiving end through the network (such as the Internet). In a simplified way, the network condition can be described by the packet loss ratio, the upper bandwidth limit, and the end-to-end (E2E) network delay or latency. To make the transmission more resilient to packet loss, schemes such as Forward Error Correction (FEC) or Packet Retransmission (PR) are used to recover the lost packets during transmission.

At the receiving end, the Unpacketizer receives packets and unpacks them by parsing them according to the related scheme (e.g., FEC). Once the packets of a video unit are all received and recovered, they are sent to the decoder. The unit is then decoded and reconstructed. The reference area of the current unit has to be decoded successfully.

The unit may not be decodable when it depends on a reference frame. The current unit cannot be decoded successfully because some of its packets have been lost during transmission. To alleviate this problem, some schemes would let the receiver send a feedback message of whether a unit is successfully decoded or not to the transmitting side to help the encoder select reliable reference frames or encode an IDR frame.

With the network being a time-variant system, it is nearly impossible to reproduce the identical results of latency and fluency in the real-world network when the encoder is used to code the same video sequence at two different times.

Therefore, it is not feasible to evaluate and compare the performance of different coding tools in the real-world network. Accordingly, there is a need to find a way to benchmark codec quality in RTC use cases reliably. The new method to determine the performance of a RTC application further, based on the determined one or more measures of the performance, adjusts one or more data transmission policies of the RTC application to improve performance of the RTC application over the Internet. For example, an adjustment can be made to the number of re-transmissions for lost data packets. As another example, an adjustment can be made to the redundancy added to data packet transmission. The present teachings disclose an improved network model that can be used to reproduce identical results given certain network conditions. It can be used to assess how a new coding tool performs relative to the original codec from the viewpoint of RTC quality.

As used herein, r is the random packet loss ratio, b is the network bandwidth limit used to transmit the media stream, d denotes the end-to-end (E2E) network delay (i.e., One Way Delay (OWD)), and s (also referenced herein as T and T) denotes the maximum number of times of repeated transmission of data packets. The maximum number is a predetermined number.

Given that anti-packet-loss schemes such as PR and FEC will impact the effective values of r, b and d, another parameter s is introduced to represent the effect of these schemes. For simplicity, the case of PR is taken as an illustrative example herein. s is defined to be the maximum number of times a packet can be sent again after it is sent initially. Usually, a packet is sent again because it is regarded as being lost at the receiving end after it was sent previously, and notification (e.g., Negative Acknowledgement (NACK)) is sent to the transmitting side. When transmit the lost packets multiple times, the E2E delay of a video unit that contains a lost packet, d becomes larger; the effective loss ratio of an initially lost packet, r becomes smaller, and the effective video bitrate b becomes smaller. s=0 represents the case when no PR is used (i.e., a packet is only sent once). A positive value of s means a reduced effective packet loss ratio. Keeping sending a lost packet repeatedly would ensure that the packet is received at the decoder side in a network with r<1 eventually. There is usually an upper limit for s in practice because a large value would incur too much of a delay or waste of bandwidth. In one illustrative implementation in accordance with the present teachings, this limit is set to be 4.

In the RTC software application (such as a video encoder) performance evaluation system illustrated in FIG. 3, the dashed box indicates the black box testing model that includes the packetizer and the unpacketizer and simulates the network. Simulation of the transmission network includes regarding or otherwise determining a data packet sent at a particular time and regarding or otherwise determining a data packet received at a particular time as well. Simulation of the transmission network also includes regarding or otherwise determining some data packets as lost and not received by the receiving device.

The input of this network model 350 is the bitstream from encoder and their corresponding sending timestamps. Conventional network models 350 do not consider burst packet losses RTC software applications. The network model 350 is represented by the four parameters of s, r, d and b. The bandwidth parameter b can usually be ignored for the sake of a codec evaluation as the video is usually coded at several different bitrates when the codec is evaluated. One of these bitrates can be regarded as fitting in the limitation of the network bandwidth. To further simplify the testing, several quantization parameter (QP) values to encode the video test sequences in the constant QP (CQP) mode are adopted. This would roughly result in a bitstream with a relatively stable bitrate for a test sequence that contains similar content. Significant change of the coded frame sizes would impact the latency and fluency of the received video. A larger coded frame is more likely to be packed into more packets and thus would take a longer time to transmit and have a higher chance of losing a packet in a lossy network. Thus, the video encoder in RTC is highly desired to generate the bitstream with a constant bitrate. In order to alleviate the difference between the CQP and CBR (standing for constant bitrate) encoding modes, a video test sequence, in which the content would not change abruptly, is referenced.

Within the network model 350 with parameters (r, d, s), a unit of video (such as a slice, a tile, or a frame) is coded and packetized into N packets. f(r,T,N) is the arriving probability of the unit of video coded into N packets; and g(r,d,N,T) is the expected arriving delay of the unit of video.

$$f(r, T, N) = \left((1 - r^{T+1})^N\right)$$

$$g(r, d, T, N) = \left(\frac{\left(\sum_{i=1}^{T}(f(r, i, N) - f(r, i-1, N))(2i+1) + f(r, 0, N)\right)d}{f(r, T, N)}\right)$$

Note that d does not affect f(r,T,N) and is proportional to g(r,d,T,N). p is a generated pseudo uniform random number between 0 and 1 (also denoted herein as [0, 1]). When is p≤f(r,T,N), all its N packets are received by the receiving end.

The determination of RTC quality measures is set forth below. Which frames are received and can be decoded fully at the decoder side based on the reference relationships is checked. The overall delay, the ratio of decodable video frames and the video freeze time are thus calculated.

Denote the number of frames that the encoder encodes as $N_E$, and the number of frames which the decoder successfully decodes as $N_D$. The set of the decodable frame index is denoted as $\{k_i | 0 \leq k_i \leq N_E - 1\}$, i=1, 2, . . . , $N_D$ $t_s$ is the sending timestamp, while $t_r$ is the receiving timestamp. $t_s^n$ is the sending timestamp of packet number n, while $t_r^n$ is the receiving timestamp of packet number n. Several measures to evaluate the overall experience are calculated.

In one implementation, the decodable frame ratio is determined using the formula below by the network model 350:

$$\frac{N_D}{N_E}$$

$N_E$ denotes the number of video frames that a video encoder encodes from a video sequence while $N_D$ denotes the number of video frames that the corresponding video decoder successfully decodes from received frame of the video sequence.

In one implementation, the overall video delay is determined by the network model 350 using the formula below, where the sending timestamp of data packet $k_i$ is $t_s^{k_i}$ and the receiving time stamp of packet $k_i$ is $t_r^{k_i}$ $$\max_{1 \leq i \leq N_D} \left(t_r^{k_i} - t_s^{k_i}\right)$$

In one implementation, overall video fluency is determined using the formula below by the network model 350:

$$\frac{\sum_{i=1}^{N_D-1}\left(t_r^{k_{i+1}} - \left(t_r^{k_i} + \frac{1}{fps}\right)\right)^2 + \left(t_r^{k_1} - t_r^1\right)^2 + \left(t_r^{N_E} - t_r^{k_{N_D}}\right)^2}{N_E}$$

Here, $$t_r^{k_i} + \frac{1}{fps}$$

represents the ideal time span of frame $k_i$, the difference between $t_r^{k_{i+1}}$ and $$t_r^{k_i} + \frac{1}{fps}$$

is the gap for the ideal time span, probably due to the lost frames or network delay with different N. Noted that there exists a probability that $$t_r^{k_{i+1}} - \left(t_r^{k_i} + \frac{1}{fps}\right) < 0,$$

this means the receiver receives frame $k_{i+1}$ when frame $k_i$'s ideal time span is not over, this is also considered as the disfluency since it displays the frame faster than expected. The last two terms are used in case the first or the last frame of the video is lost.

Figure 4:
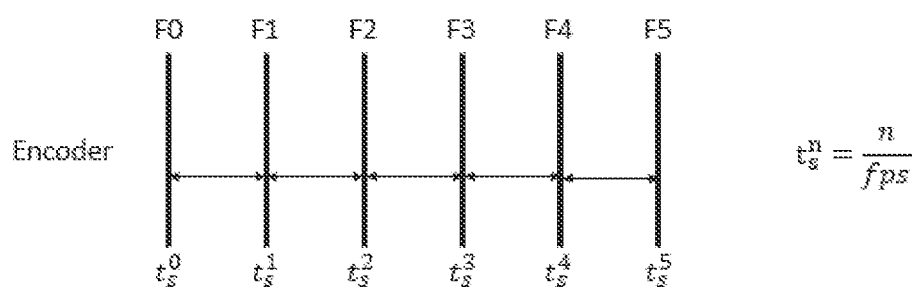
FIG. 4 is a block diagram illustrating a RTC system performance testing framework's overall video fluency for the encoding side in accordance with this disclosure.

The overall video fluency for the encoding side is shown in FIG. 4, where $$t_s^n = \frac{n}{fps}$$

Figure 5:
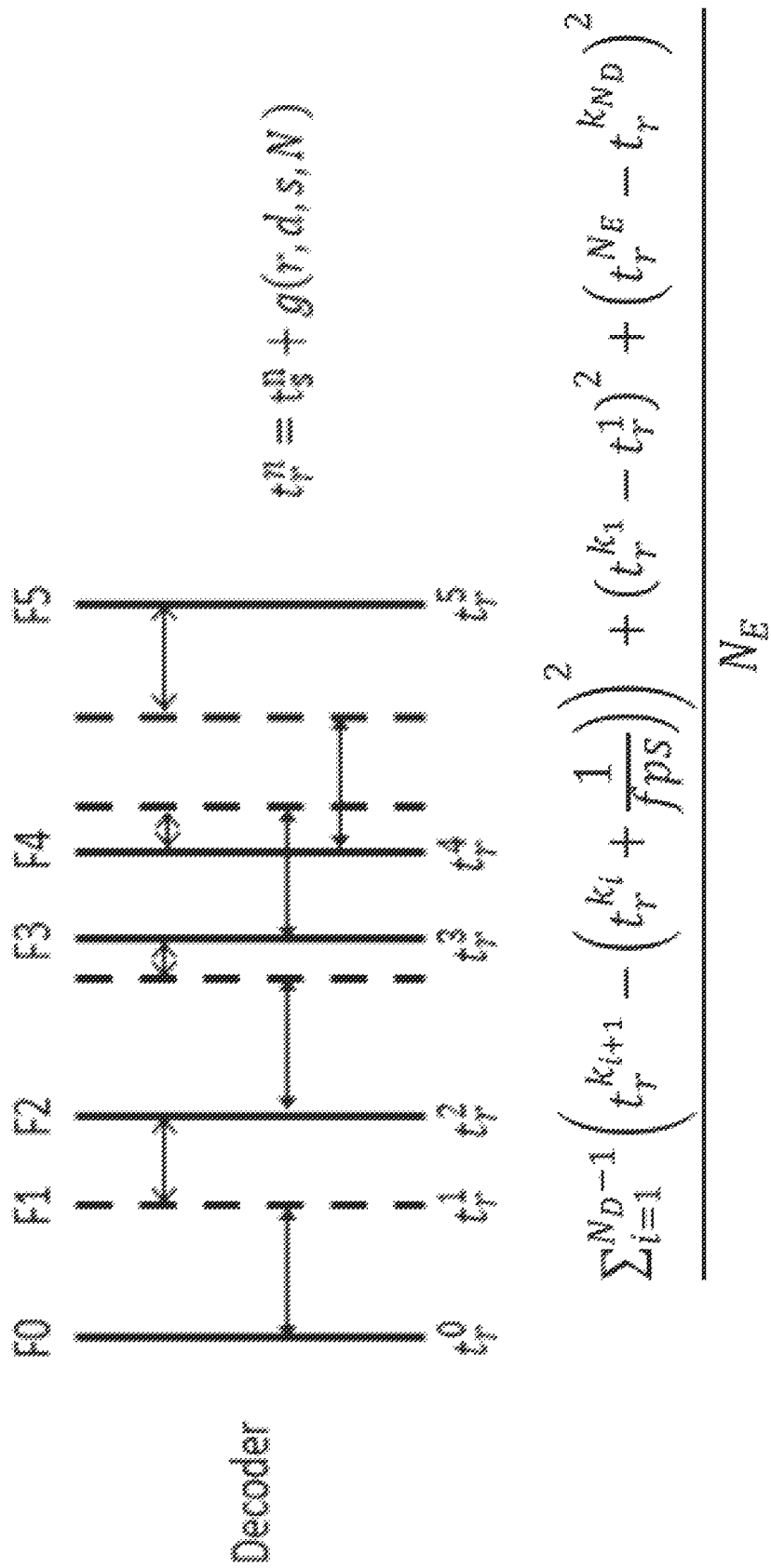
FIG. 5 is a block diagram illustrating a RTC system performance testing framework's overall video fluency for the decoding side in accordance with this disclosure.

The sequence of video frames is indicated by F0, F1, F2, F3, F4 and F5. The overall video fluency for the decoding side is shown in FIG. 5, where $$t_r^n = t_s^n + g(r,d,s,N)$$

The present disclosure provides a new system and method for determining the performance of real time communication (RTC) applications. The new system includes an improved network model that considers burst loss of data packets over a data transmission network (such as the Internet) as a factor. Since burst loss of data packets occurs in the real world RTC communications, it is desirable to take burst packet loss into consideration when the transmission performance of RTC communication products and technologies is evaluated. In one implementation, the improved RTC application performance evaluation network model that factors in burst loss of data packets is a computer software application shown in FIG. 10 and generally indicated at 1000. Alternatively, it is a component or module of the improved RTC software application 222 as shown in FIG. 11. As another example, as shown in FIG. 12, the improved RTC application performance measure determination network model 1000 conducts RTC application performance evaluation by determining performance measures of the RTC application and provides the results to the RTC application 222. The improved RTC application performance evaluation network model 1000 is a computer software application programmed using one or more computer programming languages, such as C, C++, C #, Java, etc. it performs a method to determine performance measures of the RTC software application 222.

When burst loss of data packets occurs, K (a positive integer) consecutive data packets may be lost together with certain probability during transmission of data packets (such as video data packets and audio data packets) over a communication network (such as the Internet) during RTC. As used herein, consecutive data packets are next to each other in the network transmission order. Moreover, a burst loss means the loss of a chunk of consecutive packets or a set of packets of no particular order. Accordingly, as used herein, when consecutive data packets (also referred to herein as consecutive packets) are lost during transmission over the Internet, they are referred to as the lost packets of a burst loss and burst loss (also burst packet loss and burst data packet loss) for short. Burst packet losses may be triggered by different network conditions. As used herein, the underlying condition is associated with a class or state of potential burst losses.

As used herein, it is assumed by the network model 1000 that a normal data packet that is to be sent over a network (such as the Internet) is associated with a random loss rate (also referred to herein as a random packet loss rate) $r_1$. These packets are denoted as class 1. The network model 1000 assumes or otherwise determines that there are K−1 network conditions (also referred to herein as a subset of network conditions) that can trigger K−1 classes (also referred to herein a subset of burst loss classes) of burst packet loss respectively. As used herein, a subset means zero or more. The network model 1000 further determines that the corresponding burst packet loss rates (also referred to here as a subset of burst packet loss rates) of the subset of burst loss classes are $\{r_i\}$, with i=2, 3, . . . , K. Together, there are K classes (or states) of data packets, each of which denoted as $\{X_i\}$, with corresponding probability distribution of $\{s_i\}$ and loss rates of $\{r_i\}$ respectively, where i=1, 2, . . . , K. Accordingly, $$\Sigma_{i=1}^K s_i = 1$$

$$\Sigma_{i=1}^K r_i \leq 1$$

It is desirable to know the probability for a coded unit (such as a video unit) of data for transmission over the Internet with N (a positive integer) data packets to be all received within T-times of re-transmission for lost packets over a network. This probability is represented by f(P,T,N). In a special case, class i could represent the case where i packets are lost as a burst, where i=1, 2, . . . , K.

Any packet that is sent over the communication network is either received or lost. When it is lost, it is in one of the K loss classes and also follows the distribution and loss rates described above. A lost packet may be sent again. Together with other packets to be sent (being either lost or newly generated packets), they follow the same distribution and loss rates described above. In real world applications, the number of times a data packet is re-transmitted is limited.

Figure 6:
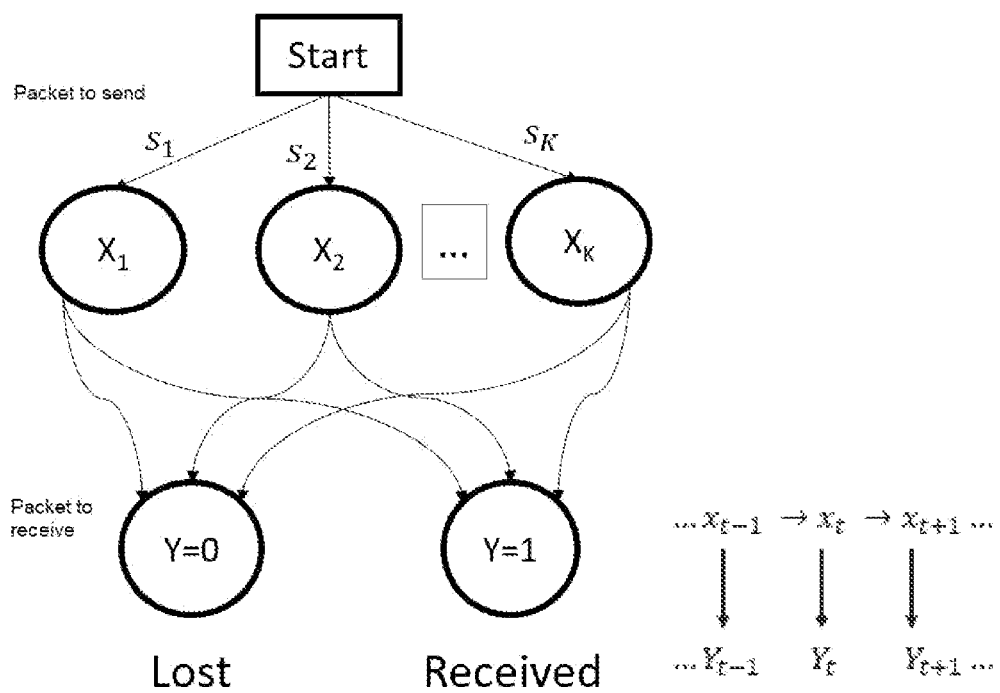
FIG. 6 is a block diagram illustrating a Hidden Markov Model (HMM) as applied to the data packets in accordance with this disclosure.
Figure 7:
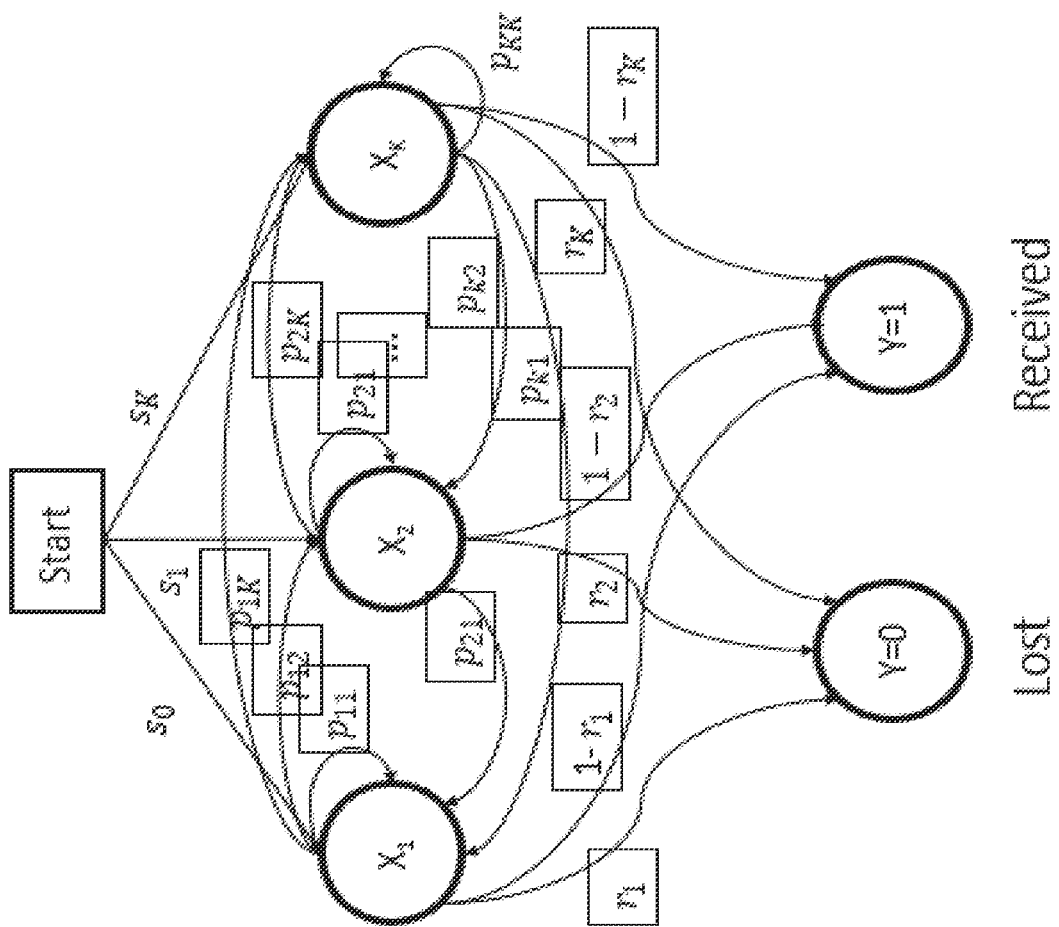
FIG. 7 is a block diagram illustrating a Hidden Markov Model (HMM) as applied to the data packets in accordance with this disclosure.

FIGS. 6 and 7 illustrate the Hidden Markov Model (HMM) as applied to the data packets by the network model 1000. An HMM is a statistical Markov model in which the system being modeled is assumed to be a Markov process. At each time point (t), the network model 1000 of the performance evaluation system checks whether a certain packet is transmitted or re-retransmitted. Its state at the transmitting side, $x_t$, denotes the class that the packet belongs to. $x_t$ takes one of the values of $\{X_i\}$, $i=1, 2, \ldots, K$. The next state $x_{t+1}$ is checked at time t+1 when the packet is re-transmitted. Then, at the receiving end, the network model 1000 of the RTC performance determination system observes whether it is received from this transfer. Y(t) stands for the reception status. The value of 1 for Y(t) indicates that it is received; the value of 0 for Y(t) indicates that it is not received (meaning lost). $x_t$ only relies on $x_{t-1}$. The packet is transmitted again if it is lost. Otherwise, the network model 1000 moves on to check the next packet to send. $Y_t$ only relies on $x_t$. Whether the packet is lost or not depends only on the state it belongs to. In other words, regarding a particular data packet, the network model 1000 determines whether it is received by determining the state it belongs to.

With T representing the maximum number of times for re-transmission, the unit data transmission success probability of a coded unit with N packets to arrive wholly is determined below:

$$f(P,T,N) = f(P,T,1)^N$$

$$f(P,T,1) = P(Y_{t=0}=1) + P(Y_{t=1}=1, Y_{t=0}=0) + P(Y_{t=2}=1, Y_{t=1}=0, Y_{t=0}=0) + \ldots +$$

$$P(Y_{t=T}=1, Y_{t=T-1}=0, \ldots, Y_{t=0}=0)$$

$$P(Y_T, Y_{T-1}, \ldots, Y_1, Y_0) = \Sigma_{x_T} P(Y_T, Y_{T-1}, \ldots, Y_1, Y_0, x_T)$$

$$P(Y_T, Y_{T-1}, \ldots, Y_1, Y_0, x_T) = \quad \text{Formula A}$$

$$\sum_{x_{T-1}} P(Y_T, Y_{T-1}, \ldots, Y_1, Y_0, x_T, x_{T-1}) =$$

$$\sum_{x_{T-1}} P(Y_T \mid Y_{T-1}, \ldots, Y_1, Y_0, x_T, x_{T-1})$$

$$P(Y_{T-1}, \ldots, Y_1, Y_0, x_T, x_{T-1}) = P(Y_T \mid x_T)$$

$$\sum_{x_{T-1}} P(x_T \mid Y_{T-1}, \ldots, Y_1, Y_0, x_{T-1}) P(Y_{T-1}, \ldots, Y_1, Y_0, x_{T-1}) =$$

$$P(Y_T \mid x_T) \sum_{x_{T-1}} P(x_T \mid x_{T-1}) P(Y_{T-1}, \ldots, Y_1, Y_0, x_{T-1})$$

$$P(Y_1, Y_0, x_1) = P(Y_1 \mid x_1) \sum_{x_0} P(x_1 \mid x_0) P(Y_0, x_0) =$$

$$P(Y_1 \mid x_1) \sum_{x_0} P(x_1 \mid x_0) P(Y_0 \mid x_0) P(x_0) P(Y_0) =$$

$$\sum_{x_0} P(Y_0, x_0) = \sum_{x_0} P(Y_0 \mid x_0) P(x_0)$$

Accordingly, $P(Y_T, Y_{T-1}, \ldots, Y_1, Y_0)$ can be computed iteratively. $P(x_i \mid x_{i-1})$ is the state transfer probability from state $X_i-1$ to state $X_i$, and $P(Y_i \mid x_i)$ is the emission probability from state $X_i$ to receiving observation $Y_i$.

$p_{ij}$ represents the probability that a data packet is in class Xj at time t+1 if it is in class Xi at time t. $i=1, 2, 3, \ldots, K$ and $j=1, 2, 3, \ldots, K$. Since $\Sigma_{j=1}^K p_{ij}=1$ and a packet more likely continues to be in class $X_i$ if it belongs to class $X_i$ now. As an example, it is here assumed that we can simply let $$p_{ii} = \frac{1}{K} + \delta, \text{ and } p_{ij} = \frac{1}{K} - \frac{\delta}{K-1}, \text{ for } 0 < \delta \leq 1 - \frac{1}{K}, K > 1$$

and when $j \neq i$. In such a case, the state transfer matrix is set forth below:

$$S = \begin{pmatrix} \frac{1}{K}+\delta & \frac{1}{K}-\frac{\delta}{K-1} & \cdots & \frac{1}{K}-\frac{\delta}{K-1} \\ \frac{1}{K}-\frac{\delta}{K-1} & \frac{1}{K}+\delta & \cdots & \frac{1}{K}-\frac{\delta}{K-1} \\ & & \cdots & \\ \frac{1}{K}-\frac{\delta}{K-1} & \frac{1}{K}-\frac{\delta}{K-1} & \cdots & \frac{1}{K}+\delta \end{pmatrix}$$

As another example, an emission matrix is set forth below:

$$E = \begin{pmatrix} r_1 & 1-r_1 \\ r_2 & 1-r_2 \\ & \cdots \\ r_K & 1-r_K \end{pmatrix},$$

where typical values for $r_i$ is 0, 5%, 10% and 50%.

In the Formular A above, $P(x_T \mid x_{T-1})$ is the state transfer matrix S' element $p_{ij}$ when $x_{T-1}$ corresponds to i and $x_T$ corresponds to j. $P(Y_T \mid x_T)$ is the emission matrix E's element $r_{ij}$ when $x_T$ corresponds to i and $Y_T$ corresponds to j.

In one implementation, the new network transmission performance evaluation system adopts the uniform distribution or favors one or more of the states as long as their sum is 1, meaning $\Sigma_{i=1}^K s_i = 1$. Alternatively, the network model 1000 collects enough data in real-world data transfer experiments and estimates values of these parameters using, for example formulas set forth in paragraph 0065 below.

Figure 8:
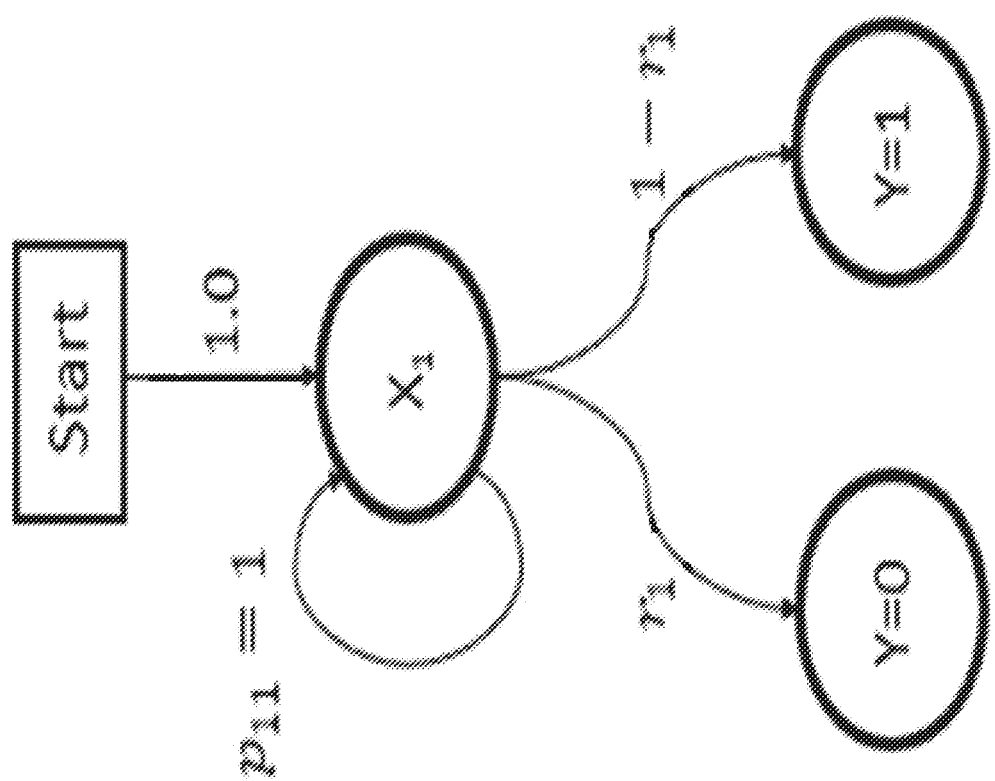
FIG. 8 is a block diagram illustrating a Hidden Markov Model (HMM) as applied to the data packets in accordance with this disclosure.

For the case where the value of K is 1, the probabilities are determined by the network model 1000 as below, while the HMM diagram becomes what is shown in FIG. 8.

$$f(P, 0, 1) = P(Y_{t=0} = 1) = 1 - r_1$$

$$f(P, 1, 1) =$$

$$P(Y_{t=0} = 1) + P(Y_{t=1} = 1, Y_{t=0} = 0) = 1 - r_1 + (1 - r_1)r_1 = 1 - r_1^2$$

$$f(P, T, N) = f(P, T, 1)^N = (1 - r_1^{T+1})^N$$

Figure 9:
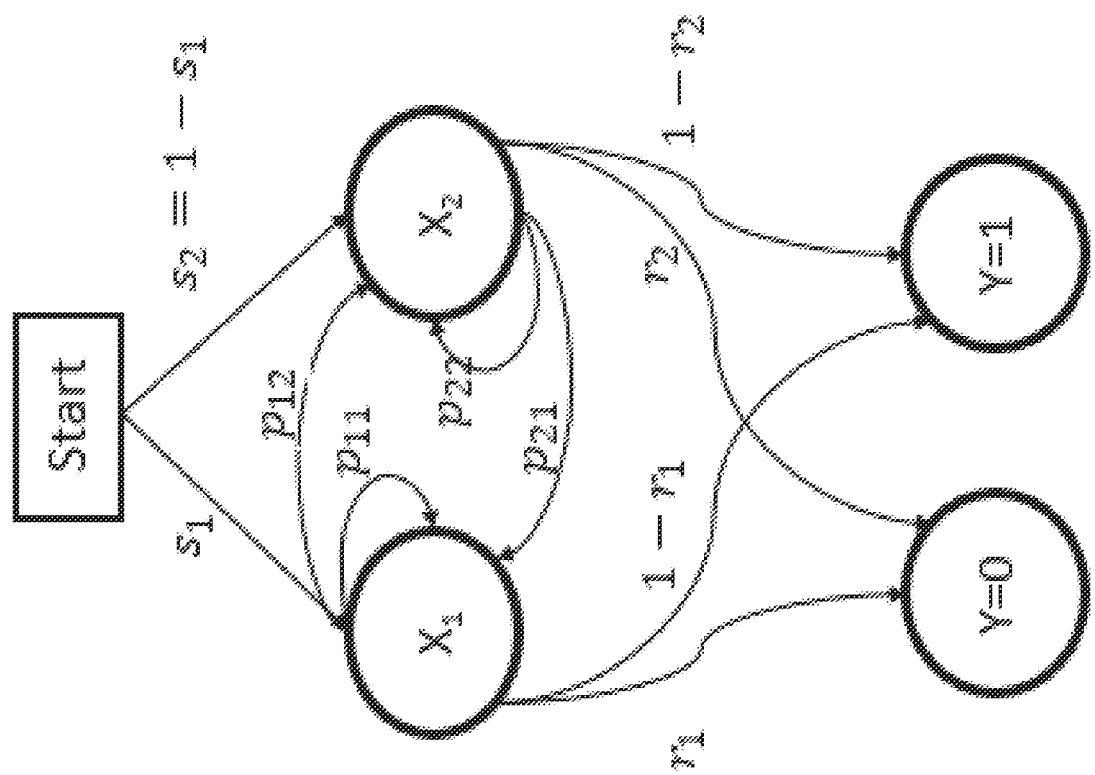
FIG. 9 is a block diagram illustrating a Hidden Markov Model (HMM) as applied to the data packets in accordance with this disclosure.

For the case where the value of K is 2, the probabilities are determined by the network model 1000 as below, while the HMM diagram becomes what is shown in FIG. 9.

$$f(P,0,1) = P(Y_{t=0}=1) = 1 - s_1 r_1 - s_2 r_2$$

$$P(Y_{t=1}=1, Y_{t=0}=0) = (1-r_1)[p_{11}s_1 r_1 + p_{21}s_2 r_2] + (1-r_2)[p_{12}s_1 r_1 + p_{22}s_2 r_2]$$

$$f(P,1,1) = P(Y_{t=0}=1) + P(Y_{t=1}=1, Y_{t=0}=0)$$

In a different implementation, the state transfer matrix S and the emission matrix E includes elements determined by the formulas below:

$$s_i = P(x_0 = i \mid Y_T, \ldots, Y_1, Y_0, \theta)$$

$$p_{ij} = \frac{\sum_{t=0}^{T-1} P(x_t = i, x_{t+1} = j \mid Y_T, \ldots, Y_1, Y_0, \theta)}{\sum_{t=0}^{T-1} P(x_t = i \mid Y_T, \ldots, Y_1, Y_0, \theta)}$$

$$r_{ij} = \frac{\sum_{t=0}^{T} \{(y_t == j)?1:0\} * P(x_t = i \mid Y_T, \ldots, Y_1, Y_0, \theta)}{\sum_{t=0}^{T} P(x_t = i \mid Y_T, \ldots, Y_1, Y_0, \theta)}$$

$$(\{s_i\}, \{p_{ij}\}, \{r_{ij}\})^* = \operatorname{argmax}_\theta P(Y_T, \ldots, Y_1, Y_0 \mid \theta)$$

$$\theta = (\{s_i\}, \{p_{ij}\}, \{r_{ij}\})$$

The most probable state (or cause) $x_T$ that triggers $(Y_T, Y_{T-1}, \ldots, Y_1, Y_0)$ is calculated by formula below:

$$\arg\max_{x_T} P(x_T|Y_T, \ldots, Y_1, Y_0) = \arg\max_{x_T} P(Y_T|x_T)$$
$$\Sigma_{x_{T-1}} P(x_T|x_{T-1}) P(x_{T-1}|Y_{T-1}, \ldots, Y_1, Y_0)$$

The most probable state (or cause) $x_t(t<T)$ or even the whole state sequence $(x_T, x_{T-1}, \ldots, x_1, x_0)$ that triggers $(Y_T, Y_{T-1}, \ldots, Y_1, Y_0)$ can be calculated using the formulas below:

$$P(x_t|Y_T, \ldots, Y_1, Y_0) = P(Y_{t+1:T}|x_t) P(x_t|Y_{1:t}) P(Y_{1:t})/P(Y_{1:T})$$

$$P(Y_{t+1:T}|x_t) = \Sigma_{x_{t+1}} P(y_{t+1}|x_{t+1}) P(x_{t+1}|x_x) P(Y_{t+2:T}|x_{t+1})$$

$$P(x_T, x_{T-1}, \ldots, x_1, x_0|Y_T, \ldots, Y_1, Y_0)$$

f(P,T,N) is a burst loss based performance measure of a RTC application or a RTC application simulation. When the RTC application burst loss based performance measure is below a predetermined value, the RTC application (such as the RTC application 222) adjusts one or more parameters. In one implementation, when the RTC application burst loss based performance measure is below the predetermined value, the RTC application increases the maximum number of times for re-transmission (or retransmission). In other words, when the RTC application burst loss based performance measure is below the predetermined value, the network model 1000 causes the RTC application to adjust a data packet transmission parameter of the RTC application. In a further implementation, when the RTC application burst loss based performance measure is above a predetermined value, the RTC application decreases the maximum number of times for re-transmission. In such a case, it is also said that the network model 1000 causes the RTC application to adjust a data packet transmission parameter of the RTC application.

The network transmission performance evaluation model 1000 disclosed herein is not limited to video data transmission. It is applicable to any type of data transfer over networks, such as the Internet. The real-time video communication system 100 is adapted to transmit other types of data while the specialized real-time video communication software application 222 is adapted to evaluate the transmission performance of such data transmission over the network 110. The state transfer matrix in real world networks may not be trivial to estimate. One such estimate involves collecting statistical data of packet reception or loss after each reception or loss event. The method disclosed herein provides a new solution to test and determine the performance of a video codec under network conditions with burst packet losses.

Obviously, many additional modifications and variations of the present disclosure are possible in light of the above teachings. Thus, it is to be understood that, within the scope of the appended claims, the disclosure may be practiced otherwise than is specifically described above.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification, but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A method for determining performance measures of a real-time communication application, said method performed by a real-time communication application performance measure determination network model and comprising:
    (1) associating a random packet loss rate to data packets for transmission over a network;
    (2) determining a subset of network conditions that can trigger a subset of burst loss classes of burst packet loss;
    (3) determining a subset of burst packet loss rates corresponding to said subset of burst loss classes of burst packet loss, wherein:
        (a) said random packet loss rate and said subset of burst packet loss rates form a set of packet loss rates;
        (b) said set of packet loss rates corresponds to a set of classes of data packets;
        (c) each data packet belongs to one class of data packets within said set of classes of data packets
        (d) said set of classes of data packets corresponds to a set of probability distribution; and
        (e) each class of data packets within said set of classes of data packets corresponds to a probability distribution within said of probability distributions;
        (f) a sum of all probability distributions within said set of probability distributions is one; and
        (g) a sum of all packet loss rates within said set of packet loss rates is one or smaller than one;
    (4) applying a Hidden Markov Model to a unit of data for transmission over said network, said unit of data including a set of data packets, wherein:
        (a) for each data packet within said set of data packets, said data packet belongs to a first class of data packets within said set of class of data packets at a first time;
        (b) said network model determines a first reception status of said data packet at said first time, said first reception status indicating whether said data packet is received or lost; and
        (c) when said first reception status indicates that said data packet is lost, said network model retransmits said data packet for a number of times until said data packet is received or the number of retransmission has reached a predetermined maximum retransmission number;
    (5) determining a unit data transmission success probability that each data packet within said set of data packets of said unit of data is received based on said set of packet loss rates, said set of probability distribution, said first reception status, and reception statuses of said number of retransmission; and (6) based on unit data transmission success probability, causing an adjustment in a data packet transmission parameter of said RTC application.

2. The method of claim 1 wherein, when said network model retransmits said data packet, at a second time, said network model determines a second reception status of said data packet at said second time, said second reception status indicating whether said data packet is received or lost, wherein said data packet belongs to a second class of data packets within said set of class of data packets at said second time.

3. The method of claim 2 wherein said unit data transmission success probability is determined by:

$$f(P, T, N) = f(P, T, 1)^N$$

$$f(P, T, 1) =$$

$$P(Y_{t=0} = 1) + P(Y_{t=1} = 1, Y_{t=0} = 0) + P(Y_{t=2} = 1, Y_{t=1} = 0, Y_{t=0} = 0) + \ldots +$$

$$P(Y_{t=T} = 1, Y_{t=T-1} = 0, \ldots, Y_{t=0} = 0)$$

$$P(Y_T, Y_{T-1}, \ldots, Y_1, Y_0) = \sum_{x_T} P(Y_T, Y_{T-1}, \ldots, Y_1, Y_0, x_T)$$

$$P(Y_T, Y_{T-1}, \ldots, Y_1, Y_0, x_T) = \sum_{x_{T-1}} P(Y_T, Y_{T-1}, \ldots, Y_1, Y_0, x_T, x_{T-1}) =$$

$$\sum_{x_{T-1}} P(Y_T \mid Y_{T-1}, \ldots, Y_1, Y_0, x_T, x_{T-1}) P(Y_{T-1}, \ldots, Y_1, Y_0, x_T, x_{T-1}) =$$

$$P(Y_T \mid x_T) \sum_{x_{T-1}} P(x_T \mid Y_{T-1}, \ldots, Y_1, Y_0, x_{T-1}) P(Y_{T-1}, \ldots, Y_1, Y_0, x_{T-1}) =$$

$$P(Y_T \mid x_T) \sum_{x_{T-1}} P(x_T \mid x_{T-1}) P(Y_{T-1}, \ldots, Y_1, Y_0, x_{T-1})$$

$$P(Y_1, Y_0, x_1) =$$

$$P(Y_1 \mid x_1) \sum_{x_0} P(x_1 \mid x_0) P(Y_0, x_0) = P(Y_1 \mid x_1) \sum_{x_0} P(x_1 \mid x_0) P(Y_0 \mid x_0) P(x_0)$$

$$P(Y_0) = \sum_{x_0} P(Y_0, x_0) = \sum_{x_0} P(Y_0 \mid x_0) P(x_0)$$

where $r_1$ stands said random packet loss rate; $\{r_i\}$ stand for said subset of burst packet loss rates, i=2, 3, ..., K; K−1 stands for the number of burst packet loss rates within said set of burst packet loss rates; the P parameter of the f functions represents a probability of an event represented by some states and observations; $\{X_i\}$, i=1, 2, 3, ..., K, stand for said set of classes of data packets; $\{S_i\}$, i=1, 2, 3, ..., K, stand for said set of set of probability distributions; T represents said predetermined maximum retransmission number; N represents the number of data packets within said set of data packets of said unit of data; t represents said first time; t+1 represents said second time; xt stands for the class of data packets that said data packet belong to and is checked at time t; $x_{t+1}$ is checked at time t+1. $Y_t$ stands for the observed reception status of said data packet at time t, where $Y_t$=1 means that said data packet is received while $Y_t$=0 means that said data packet is lost; $P(x_i \mid x_{i-1})$ is the state transfer probability from state $x_{i-1}$ to state $x_i$, and $P(Y_i \mid x_i)$ is the emission probability from state $x_i$ to receiving observation $Y_i$.

4. The method of claim 3 wherein said $P(x_T \mid x_{T-1})$ values are determined using a state transfer matrix below, where $x_T$ corresponds to $x_i$; and $x_{T-1}$ corresponds to $x_j$:

$$S = \begin{pmatrix} \frac{1}{K} + \delta & \frac{1}{K} - \frac{\delta}{K-1} & \cdots & \frac{1}{K} - \frac{\delta}{K-1} \\ \frac{1}{K} - \frac{\delta}{K-1} & \frac{1}{K} + \delta & \cdots & \frac{1}{K} - \frac{\delta}{K-1} \\ & & \cdots & \\ \frac{1}{K} - \frac{\delta}{K-1} & \frac{1}{K} - \frac{\delta}{K-1} & \cdots & \frac{1}{K} + \delta \end{pmatrix}$$

where $0 < \delta \leq 1 - \frac{1}{K}; K > 1; i = 1, 2, \ldots, K; j = 1, 2, \ldots, K$.

5. The method of claim 4 wherein said $P(Y_T \mid x_T)$ is an element $r_{ij}$ of an emission matrix set forth below when $x_T$ corresponds to j and $Y_T$ corresponds to j:

$$E = \begin{pmatrix} r_1 & 1 - r_1 \\ r_2 & 1 - r_2 \\ & \cdots \\ r_K & 1 - r_K \end{pmatrix}.$$

6. The method of claim 5 wherein said $r_1, \ldots, r_k$ each have a value of 0, 0.05, 0.1 or 0.5.

7. The method of claim 4 wherein said $P(x_T \mid x_{T-1})$ and $P(Y_T \mid x_T)$ are determined using formulas below, where $x_T$ corresponds to j, $x_{T-1}$ corresponds to i and $Y_T$ corresponds to j:

$$s_i = P(x_0 = i \mid Y_T, \ldots, Y_1, Y_0, \theta)$$

$$p_{ij} = \frac{\sum_{t=0}^{T-1} P(x_t = i, x_{t+1} = j \mid Y_T, \ldots, Y_1, Y_0, \theta)}{\sum_{t=0}^{T-1} P(x_t = i \mid Y_T, \ldots, Y_1, Y_0, \theta)}$$

$$r_{ij} = \frac{\sum_{t=0}^{T} \{(y_t == j)?1:0\} * P(x_t = i \mid Y_T, \ldots, Y_1, Y_0, \theta)}{\sum_{t=0}^{T} P(x_t = i \mid Y_T, \ldots, Y_1, Y_0, \theta)}$$

$$(\{s_i\}, \{p_{ij}\}, \{r_{ij}\})^* = \mathrm{argmax}_\theta P(Y_T, \ldots, Y_1, Y_0 \mid \theta)$$

$$\theta = (\{s_i\}, \{p_{ij}\}, \{r_{ij}\})$$

$$\mathrm{argmax}_{x_T} P(x_T \mid Y_T, \ldots, Y_1, Y_0) = \mathrm{argmax}_{x_T} P(Y_T \mid x_T)$$

$$\sum_{x_{T-1}} P(x_T \mid x_{T-1}) P(x_{T-1} \mid Y_{T-1}, \ldots, Y_1, Y_0) P(x_t \mid Y_T, \ldots, Y_1, Y_0) =$$

$$P(Y_{t+1:T} \mid x_t) P(x_t \mid Y_{1:t}) P(Y_{1:t}) / P(Y_{1:T}) P(Y_{t+1:T} \mid x_t) = \sum_{x_{t+1}} P(y_{t+1} \mid x_{t+1})$$

$$P(x_{t+1} \mid x_x) P(Y_{t+2:T} \mid x_{t+1}) P(x_T, x_{T-1}, \ldots, x_1, x_0 \mid Y_T, \ldots, Y_1, Y_0).$$

8. The method of claim 5 wherein said network is the Internet.

9. The method of claim 5 wherein said subset of network conditions includes zero or more network conditions.

10. The method of claim 5 wherein said unit of data is a unit of video data.

11. The method of claim 5 wherein said adjustment is an increase in said predetermined maximum retransmission number or a decrease in said predetermined maximum retransmission number.

12. The method of claim 5 wherein said network is the Internet.

13. The method of claim 3 wherein said subset of network conditions includes zero or more network conditions.

14. The method of claim 3 wherein said unit of data is a unit of video data.

15. The method of claim 3 wherein said adjustment is an increase in said predetermined maximum retransmission number or a decrease in said predetermined maximum retransmission number.

16. The method of claim 2 wherein said network is the Internet.

17. The method of claim 2 wherein said subset of network conditions includes zero or more network conditions.

18. The method of claim 2 wherein said unit of data is a unit of video data.

19. The method of claim 2 wherein said adjustment is an increase in said predetermined maximum retransmission number or a decrease in said predetermined maximum retransmission number.

* * * * *